Patented Nov. 29, 1949

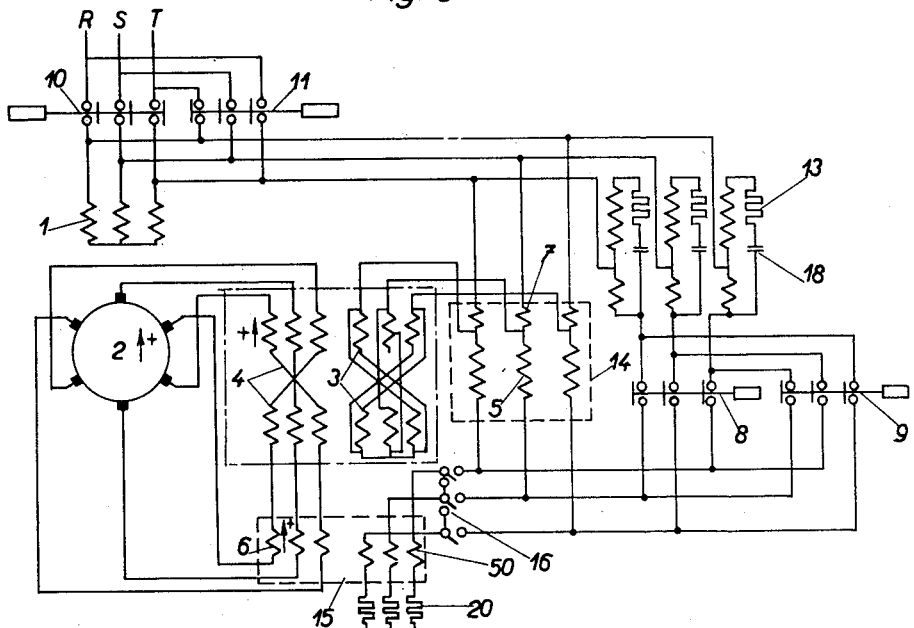
Fig. 5
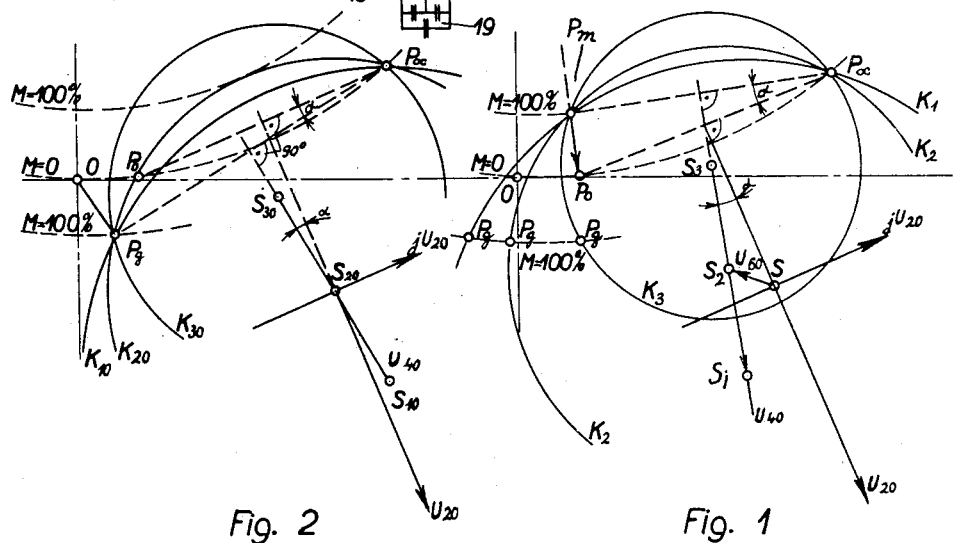
Fig. 2
Fig. 1

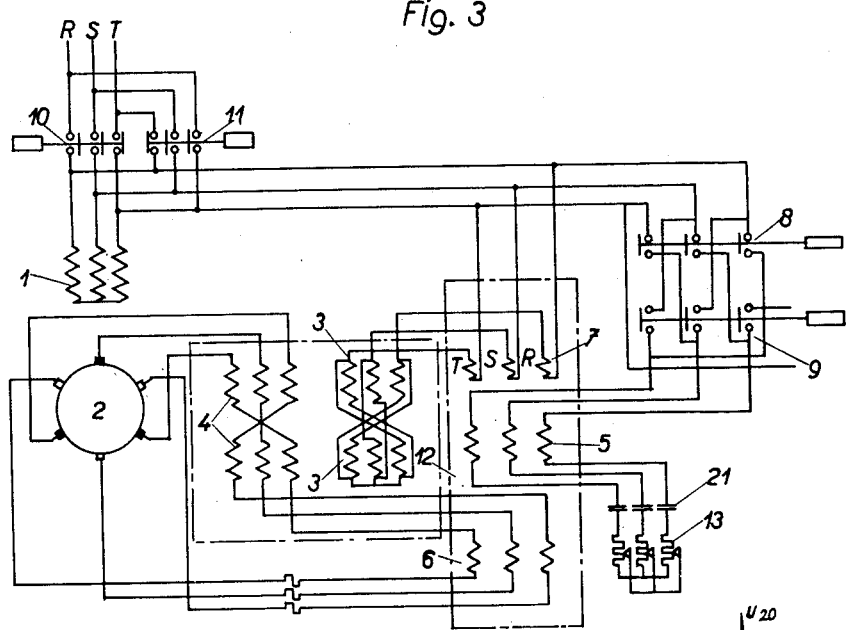
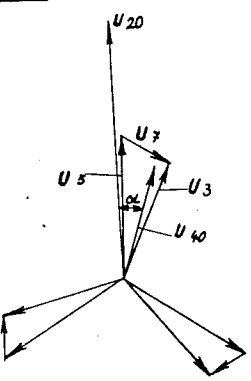
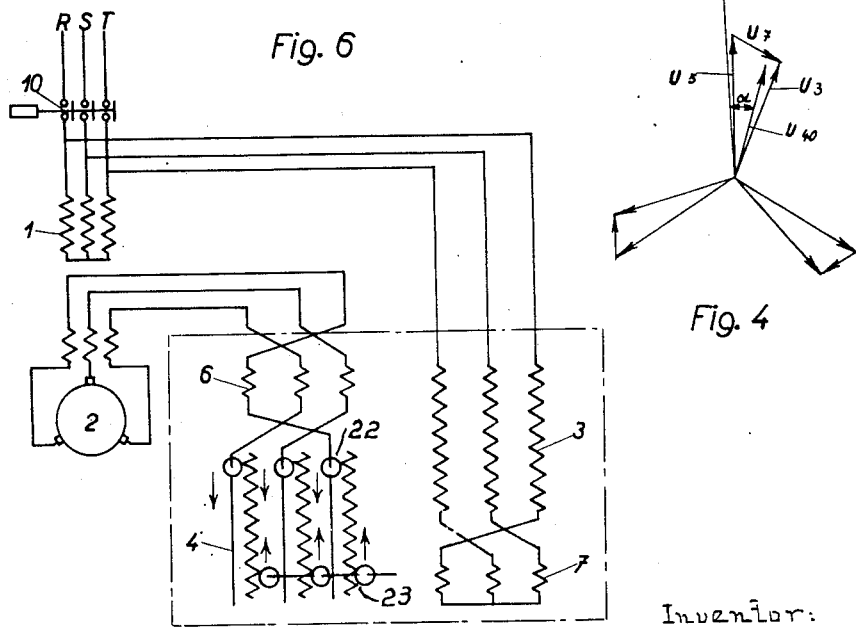

2,489,897

UNITED STATES PATENT OFFICE 2,489,897

ARRANGEMENT FOR COMPENSATING THE PHASE OF SHUNT COMMUTATOR MOTORS

Vilém Klíma, Prague, Czechoslovakia, assignor of one-half to Moravian Electrical Engineering Works, National Corporation, Olomouc, Czechoslovakia Application February 14, 1948, Serial No. 8,434 In Germany December 8, 1941

Section 1, Public Law 690, August 8, 1946
Patent expires December 8, 1961

12 Claims. (Cl. 318—244)

This invention relates to A. C. shunt commutator motors and generators and, more particularly, to a novel arrangement for introducing compensating voltages into the commutator circuits of such motors.

In order to obtain satisfactory operation of A. C. shunt commutator motors, to obtain sufficient overload capacity, avoid excessive increase in commutating currents, and to avoid too great a decrease in speed with increased load, it is necessary to introduce a compensating voltage into the commutator circuits. To obtain adequate speed regulation at constant torque, the required compensating voltage is greater in the sub-synchronous speed range than it is in the super-synchronous speed range. The required variation in compensating voltage can be effected by introducing, into the commutator circuit of a stator fed shunt commutator motor, a voltage comprising a constant and mainly compensating component and a variable speed regulation component.

Such two-part voltage may be applied, for example, from a double induction regulator, from a regulating transformer, or from a tapped stator winding. The substantially constant compensating component can be supplied, for instance, from a compensating transformer, or from an auxiliary winding in the stator of the motor or in the primary of the regulator or transformer. The variation of the speed regulating component, in accordance with deviations of the motor from synchronous speed, can be attained by means of a permanent brush displacement counter to the direction of rotation.

However, this solution is not always useful, e. g. it is not applicable with reversible operation as it would be necessary to change the position of the brushes with every change of the direction of rotation. Also, with motors having commutating poles or commutating fields, it is impossible to displace the brushes.

Accordingly, compensating arrangements have been proposed in which such brush displacement is avoided, such as by using a double induction regulator to produce the variable compensating voltage. Alternatively, additional secondary windings, for producing the compensating voltage, have been arranged in the secondary section of a double induction regulator used as a speed controller. Such arrangements, are difficult to effect in practice, due to difficulties in designing the regulator for the heavy currents and low voltages involved, and because such a regulator has a large reactance which impairs the performance of the motor. The mechanical coupling of two double induction regulators introduces complications, the whole arrangement being unduly expensive. Likewise, the adding of secondary windings in the regulator for speed regulation is not only difficult but also expensive. For reversing motors, this second arrangement cannot be carried out practically, as it would be necessary to reverse the commutating circuit with every change of the direction of rotation, making necessary the provision of several contactors adapted to carry heavy currents.

Another known expedient is to excite the compensating transformer by a combination of line voltage and variable secondary voltage of the regulator, instead of by a constant line voltage alone. This arrangement avoids the expensive double induction regulator, but practically always requires a second transformer and, with reversible operation, four contactors are required. The second transformer represents an additional load on the regulating transformer in the sub-synchronous speed range, so that the operating curves are no longer circular but are algebraic curves of the first degree, further complicating the design.

For these reasons, it has been customary, with reversible motors and the same operating requirements in both directions to dispense with brush displacement and with variation of the compensating voltage. This results in using only a constant compensating voltage derived from a special compensating transformer in order to avoid alterations in the secondary circuit.

The present invention avoids the disadvantages of the circuit connections known hitherto and makes it possible to attain the desired characteristic of the compensating voltage without brush displacement and without the use of special induction regulators or of an additional secondary winding in the induction regulator for speed regulation without special transformers.

An object of the present invention is to provide a novel compensating circuit arrangement for A. C. shunt commutator devices.

Another object is to provide such an arrangement which is simple, inexpensive and effective.

These, and other objects, advantages and novel features of the invention will be apparent from the following description and the accompanying drawings.

In the drawings:

Figs. 1 and 2 are circle diagrams of current and voltage relationships involved in the present invention.

Figs. 3, 5, 6 and 7 are schematic wiring diagrams of arrangements which the invention may assume in practice.

Fig. 4 is a vector diagram further illustrating the invention principles.

Figure 7:
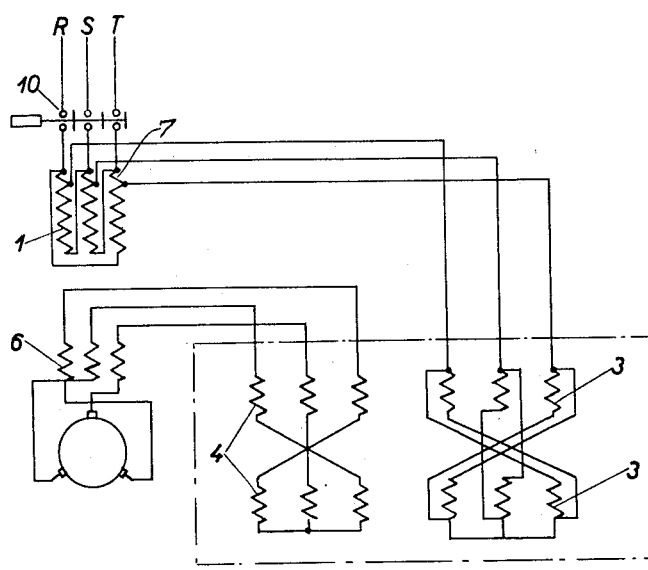

In Fig. 1 are illustrated three curves (circles) $K1$, $K2$, $K3$ of the stator or rotor current of a shunt commutating motor for different regulating positions, i. e. the lowest, the medium and the highest position. It is possible to prove that all circles pass through a common point, e. g. the nominal point $P_m$ at which the torque $M = 100\%$, if the voltages $SS_1$, $SS_2$, and $SS_3$, applied to the rotor and measured with open rotor circuit, have the illustrated relation to the rotor stalling voltage $U_{20}$, also as measured with open rotor circuit. The line $S_1—S_2—S_3$ is the locus of the centers of circles $K_1$, $K_2$, $K_3$ and therefore the perpendicular bisector of the line $P_m—P\infty$. $U_{20}$ is the perpendicular bisector of the line $P_o—P\infty$, wherein $P_o$ is the no-load open rotor circuit point, $P\infty$ the point of infinite slip, and $S$ the center of the circles with the regulators short circuited on the primary side or with compensating transformers. $OP$ is proportional to the stator current and $P_oP$ is proportional to the rotor current, $P$ being any point on the circles.

As can be seen, if the commutator motor is to be operated in the whole regulation range with constant torque and if it is to work with currents as small as possible, it is necessary to feed into the secondary circuit of the commutator motor a secondary voltage, the magnitude and vectorial position of which corresponds, with an open rotor circuit, to the distance of the different points of the straight line $S_1—S_3$ from the point $S$ or from the vector $U_{20}$, respectively. This characteristic can be divided into a constant voltage $SS_1 = U_{60}$ and into a voltage $S_2—S_1$ to $S_2—S_3$, which is displaced in phase by the angle $\alpha$ with respect to the armature rest voltage.

In accordance with the present invention, this may be effected by the circuit connections illustrated in Fig. 3. Referring to this Figure, 1 designates the three-phase stator winding connected through reversing contactors 10, 11 to the line, 2 represents the rotor of a shunt commutator motor, 3 the primary winding and 4 the secondary winding of a double induction regulator, which can be replaced by a regulating transformer having a fixed number of primary windings. The voltage $S_2—S_1$ to $S_2—S_3$ is derived from the regulator 3—4, the phase displacement thereof with respect to $U_{20}$ being effected by a transformer 12 having a primary winding 5 and a secondary winding 7. Winding 5 is connected through reversing contactors 8, 9 to the supply lines, and winding 7 is connected in series with winding 3 and the supply lines. With this circuit, the voltage of windings 3 may be varied by a suitable variation of the voltage induced in winding 7, such variation being preferably a variation in phase. However, if desired, the voltage of winding 7 may also be varied in magnitude. The variation of the voltage of winding 7 is effected in such a manner that the voltage induced in windings 4 is displaced in phase by the angle $\alpha$ with respect to $U_{20}$. An additional secondary winding 6 is also included in transformer 12, to produce the voltage $U_{60}$. Winding 6 is included in the commutating circuit so that the desired relations of the regulating and compenstating voltages can be obtained by means of a single, relatively small, three-winding transformer 12, the capacity of which is a maximum of about 10% of the output of the motor at synchronous speed.

An important advantage of this arrangement is that, by a suitable choice of the phase relations of windings 6 and 7, it is possible to obtain the desired results illustrated in Fig. 1 by the use of two very small switches 8 and 9 for both directions of rotation, and these switches need only to be dimensioned for a maximum of 10% of the stator current of the commutator motor and the commutator circuit need not be interrupted.

It has already been suggested to connect a secondary winding of an autotransformer in series with the primary circuit of a single induction regulator, but the introduced voltage is not displaced in phase and is effective as a compensating voltage with brush displacement only in the neighborhood of synchronous speed. With this arrangement, the magnitude, but not the phase, of the regulating voltage is varied whereas, with the invention arrangement the phase is varied as variation in magnitude would not achieve the desired effect.

With speed regulation and constant torque, the armature current and thus the current through windings 4 and 6 is constant. At the lowest regulating position, the ampere turns of windings 6 and 7 are substantially in the same direction but, with increasing speed, the ampere turns of winding 7 are gradually decreased as a result of the variable ratio between windings 3 and 4. Disregarding the magnetizing current of the regulator, the ampere turns of winding 7 become zero when voltage $U_{40}$ is zero, and become relatively negative at super-synchronous speed. At a certain super-synchronous speed, the resulting compensating voltage becomes zero and the ampere turns of windings 6 and 7 are equal and oppositely directed so that the effective current in winding 5 is zero.

According to the invention use is made of this characteristic of the current in the winding 5 in such a way that in series with this winding are connected resistances 13, capacities or other phase shifting components either singly or in combination. With capacities in the rotor circuit, the reactance is reduced and the centers of the current circles are in a higher position. While this is desired with respect to circles $K_1$ and $K_2$, at least during operation as a motor, it is undesirable for circle $K_3$. In the latter case, for super-synchronous operation, the center of circle $K_3$ would lie in too high a position. Heretofore, the capacities in the rotor circuit have been so selected as to be smaller for super-synchronous operation than for sub-synchronous operation. These prior arrangements have required switches to cut the capacities into and out of circuit, or have required a change in transformer ratios if the same capacity has been used for both types of operation.

The insertion of resistances in the rotor circuit reduces the magnitude of $S_1—S_2$. In the sub-synchronous range, this increases the load capacity when running as a motor, and the effect in the super-synchronous range is in the opposite direction. Accordingly, it is desirable to change the value of the resistance in accordance with a change in the regulating position such that the resistance value decreases from a maximum in the lowest regulating position to a minimum in the highest regulating position. With the invention arrangement, this is accomplished without the use of switches as the resistance 13 or other phase displacement components carry a current which varies according to the regulating position.

It is known to insert condensers or resistances in that part of the primary circuit carrying the total current of the regulating transformers, which current varies in value in accordance with speed. With these known arrangements, the current begins to increase as synchronous operation is attained and reaches full value at maximum speed. This is not desirable.

In contradistinction, with the invention arrangement, the current becomes zero at a predetermined super-synchronous speed, thus achieving the desired condition.

The invention may be carried out in other circuit arrangements. For example, in Fig. 5, the single transformer 12 of Fig. 3 is replaced by two transformers 14 and 15, which may be desirable in certain cases. The winding 5, in this case, is delta-connected instead of star-connected, and windings 5 and 7 are arranged as an auto-transformer. The condensers 18 and resistances 13 are again connected, by means of an auto-transformer 17, in such a way that they carry the total current of the primary windings 5 and 50, corresponding to the resulting current in windings 6 and 7. In series with the winding 50 may be arranged devices, known per se, for the protection and for the measurement of the secondary current e. g. overload protection devices, so that current transformers can be dispensed with.

With machines which, under actual conditions, are required to operate as a motor as well as a generator, such as in dynamic braking in which a machine operates as a motor for the running in of internal combustion engines and as a generator for the braking thereof, a permanent brush position is disadvantageous. This is due to the fact that the desired compensating voltage, when the machine is operating as a generator, should have a substantially characteristic and therefore require a different brush position from that when operating as a motor. As illustrated in Fig. 2, satisfactory operation can be obtained if the value of the compensating voltage is varied. If the value remained constant, as during operation as a motor, the commutator currents would increase considerably as may be seen from Fig. 1 wherein, for full load torque when running as a generator, the rotor current is proportional to the distance $P_0$—$P_g$. Referring to Fig. 2, if the constant component of compensating voltage is eliminated and if the variable component is of opposing polarity, the intensity of the rotor current is considerably decreased. To effect this with generator operation, switch 16 is used to disconnect and short-circuit winding 50, and contactor 9 is closed with contactor 8 being opened to reverse the polarity. With a cradle dynamometer, in which the stator casing is oscillatably mounted, the operation of the switches to transfer from motor to generator operation can be automatically effected. It is therefore possible with the employment of three contactors 8, 9, 16 to ensure a satisfactory operation as a motor as well as in the range of operation as a generator in both directions of rotation, which is especially advantageous for pendulum brakes with two shaft ends and two working stations. For operation as a motor only, two switches 8, 9 are sufficient according to Fig. 3.

The windings 3, 4, 6 and 7 may be arranged within the regulator, which is of advantage with smaller machines. Such an arrangement is illustrated in Fig. 6 in which the motor is shown as having a three-brush connection. The regulating transformer has a winding 4 comprising, for example, bare wire on which two sets of contacting rollers move in opposite directions. The same winding 4 may be used in the sub-synchronous range as well as in the super-synchronous range. A winding 6 is connected in series with winding 4 to produce the constant component of the compensating voltage, although it also produces a circuit speed regulating component. Winding 3 is connected in series with winding 7, which causes a relative rotation of the regulating voltage to effect the desired variable compensation.

Windings 7 may also be arranged in the stator of the motor, as shown in Fig. 7. The auxiliary voltage is produced in windings 7 which are identical with primary windings 1 of the motor. Windings 7 also operate to reduce the primary voltage of the regulator 3—3, and the winding 6 develops the constant component of the regulating voltage and may also be used to shift the synchronous speed.

Naturally, a part of the condenser 19 or/and resistances 20 may be inserted into the rotor circuit or at places carrying currents proportional to the rotor current as illustrated in Fig. 5, whereby every desired characteristic of the total impedance may be obtained.

In a similar way this arrangement can also be applied to shunt commutator motors using for the regulation a single induction regulator in combination with a constant auxiliary voltage, either in the stator of the commutator motor or in a special auxiliary transformer; this arrangement can be applied with fixed as well as with movable brush holder, although the described characteristic of the compensating voltage is not attainable to such an extent as with a motor with fixed brush holders according to the attached illustrations.

I claim:

1. In a regulating system for an A. C. shunt commutator machine with a fixed brush axis and having its stator connected to an A. C. supply circuit and its rotor connected to the secondary of an inductive regulating device means for introducing a compensating voltage into the rotor, said means comprising, in combination, winding means inductively coupled to said device; circuit means operative to impress the supply circuit voltage on said winding means; and reactance means in circuit connection with said windings means and operative to vary the phase of the voltage in said winding means as a function of the rotor current to vary the value of the compensating voltage induced in said device by said winding means.

2. In a regulating system for an A. C. shunt commutator machine with a fixed brush axis and having its stator connected to an A. C. supply circuit and its rotor connected to the secondary of an inductive regulating device means for introducing a compensating voltage into the rotor, said means comprising, in combination, winding means inductively coupled to said device; circuit means operative to impress the supply circuit voltage on said winding means; reactance means in circuit connection with said windings means and operative to vary the phase of the voltage in said winding means as a function of the rotor current to vary the value of the compensating voltage induced in said device by said winding means; and switch means included in said circuit means and selectively operable to reverse the relative polarity of said winding means.

3. In a regulating system for an A. C. shunt commutator machine with a fixed brush axis and having its stator connected to an A. C. supply circuit and its rotor connected to the secondary of an inductive regulating device means for introducing a compensating voltage into the rotor, said means comprising, in combination, a first winding connected in series between the primary of said device and the supply circuit; a second winding connected in series between the secondary of said device and said rotor; winding means inductively coupled to said first and second windings; circuit means operative to impress the supply circuit voltage on said winding means; and reactance means in circuit connection with said winding means and operative to vary the phase of the voltage in said winding means as a function of the rotor current to vary the value of the compensating voltage induced in said second winding by said winding means.

4. In a regulating system for an A. C. shunt commutator machine with a fixed brush axis and having its stator connected to an A. C. supply circuit and its rotor connected to the secondary of an inductive regulating device means for introducing a compensating voltage into the rotor, said means comprising, in combination, a first winding connected in series between the primary of said device and the supply circuit; a second winding connected in series between the secondary of said device and said rotor; winding means inductively coupled to said first and second windings; circuit means operative to impress the supply circuit voltage on said winding means; reactances means in circuit connection with said winding means and operative to vary the phase of the voltage in said winding means as a function of the current in said first winding to vary the value of the compensating voltage induced in said second winding by said winding means.

5. An arrangement as claimed in claim 1 in which said device comprises a double induction regulator.

6. An arrangement as claimed in claim 3 in which said winding means comprises the primary of a transformer and said first and second windings comprise secondaries of the transformer.

7. An arrangement as claimed in claim 2 in which the stator of said machine is mounted for a limited degree of oscillation and connected to operate said switch means upon a change from motor operation to generator operation or vice versa.

8. An arrangement as claimed in claim 3 including means for adjusting the number of turns of the secondary of said device.

9. An arrangement as claimed in claim 1 in which said reactance means comprises resistances and capacitances.

10. In a regulating system for an A. C. shunt commutator machine with a fixed brush axis and having its stator connected to an A. C. supply circuit and its rotor connected to the secondary of an inductive regulating device means for introducing a compensating voltage into the rotor, said means comprising, in combination, a first winding connected in series between the primary of said device and the supply circuit; a second winding connected in series between the secondary of said device and said rotor; a first winding means inductively coupled to said first winding; a second winding means inductively coupled to said second winding; circuit means operative to impress the supply circuit voltage on said winding means; reactance means in circuit connection with said winding means and operative to vary the phase of the voltage in said winding means as a function of the current in said first winding to vary the value of the compensating voltage induced in said second winding by said winding means; first switch means selectively operable to disconnect said second winding means from the supply circuit and to short circuit said second winding means; and switch means included in said circuit means and selectively operable to reverse the relative polarity of said first winding means.

11. An arrangement as claimed in claim 10 in in which said first winding and said first winding means are associated in an auto-transformer relationship.

12. An arrangement as claimed in claim 3 in which said first winding is included in the stator of said machine.

VILÉM KLÍMA.

REFERENCES CITED

The following references are of record in the file of this patent:

UNITED STATES PATENTS

| Number | Name | Date |
| --- | --- | --- |
| 1,922,810 | Hull | Aug. 15, 1933 |
| 2,108,620 | Stober | Feb. 15, 1938 |
| 2,249,447 | Walker et al. | July 15, 1941 |

FOREIGN PATENTS

| Number | Country | Date |
| --- | --- | --- |
| 260,337 | Great Britain | Oct. 27, 1926 |